July 12, 1966      A. F. CRONE      3,260,175
LONGITUDINAL JOINT SUPPORT
Filed Jan. 11, 1963      3 Sheets-Sheet 1
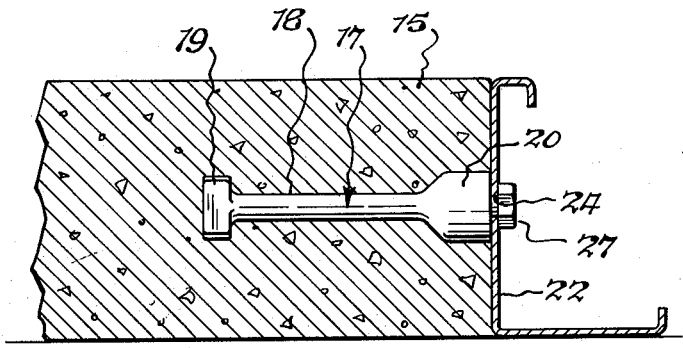
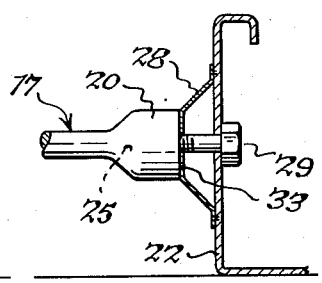
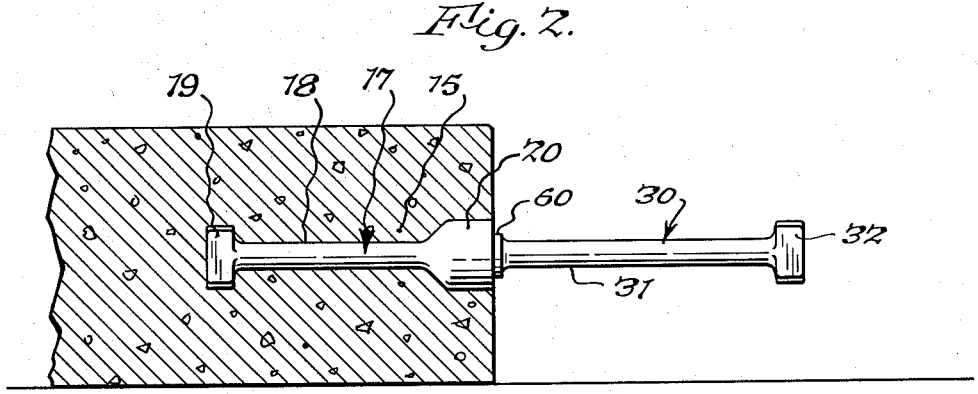
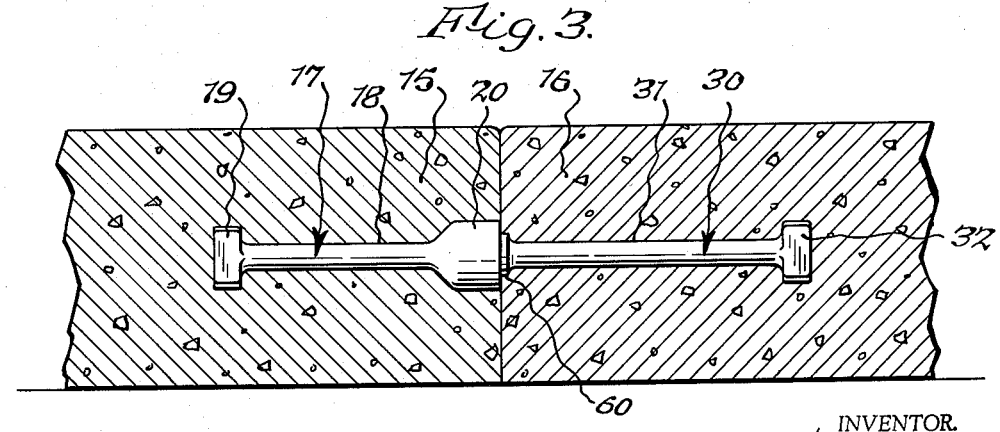
INVENTOR.
Alfred F. Crone
BY
ATTORNEYS.

July 12, 1966  A. F. CRONE  3,260,175
LONGITUDINAL JOINT SUPPORT
Filed Jan. 11, 1963  3 Sheets-Sheet 2
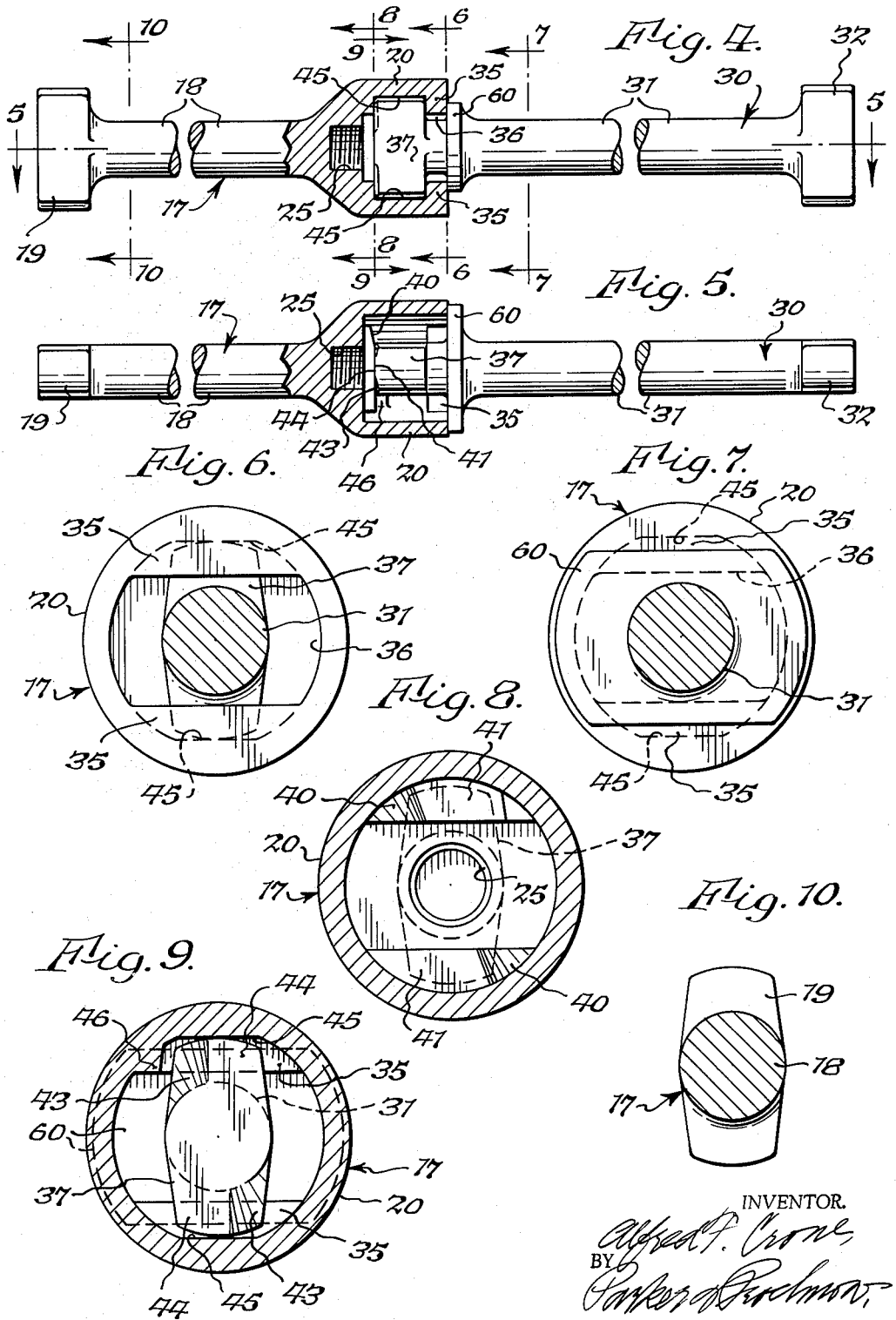
INVENTOR.
Alfred F. Crone
BY
Parker & Buchman
ATTORNEYS.

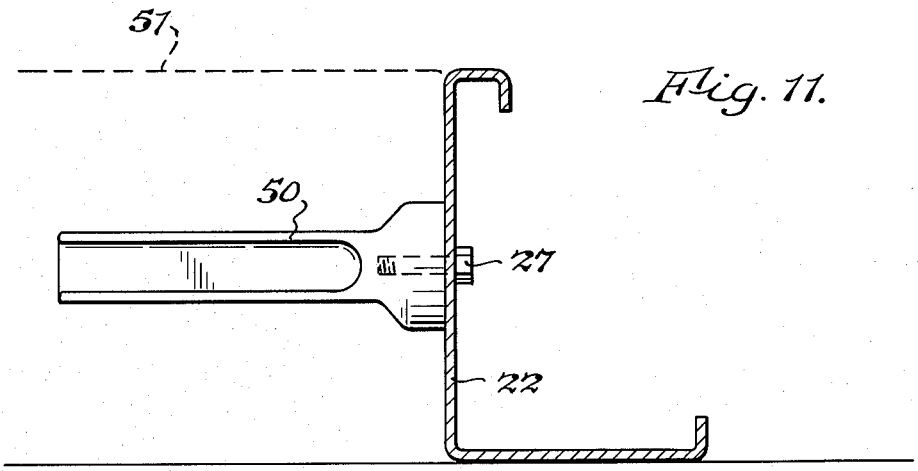
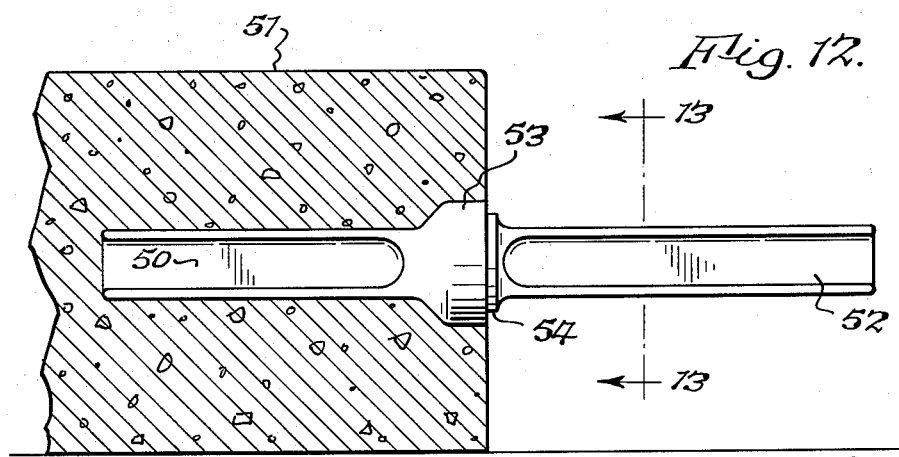
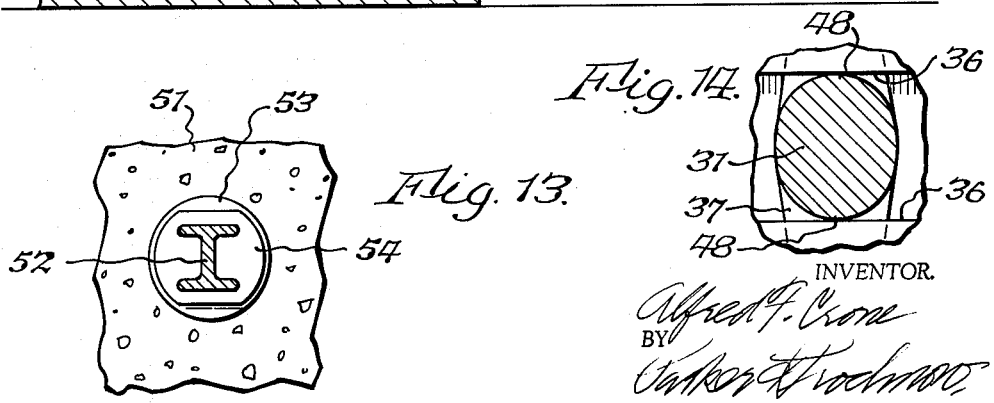

United States Patent Office 3,260,175
Patented July 12, 1966

3,260,175
LONGITUDINAL JOINT SUPPORT
Alfred F. Crone, Williamsville, N.Y., assignor to Acme Highway Products Corporation, Buffalo, N.Y.
Filed Jan. 11, 1963, Ser. No. 250,940
3 Claims. (Cl. 94—17)

This invention relates to joint supports of the type used between parallel and adjacent strips or lanes of a highway or airfields to hold the strips against separation and vertical movement relatively to each other. This invention relates more particularly to joint supports which are applicable to highways or airfields in which the adjoining strips are laid at different times.

In many instances where two parallel strips or lanes of a pavement are arranged side by side, particularly when they are laid at different times, there are differences in expansion and contraction of the two lanes, causing slight longitudinal movement of one lane relatively to the other, which may be due to various causes.

It is consequently an object of this invention to provide longitudinal joint supports constructed to permit slight longitudinal movement of the two lanes of the pavement, and opposing the movement of the lanes laterally or vertically relatively to each other.

It is also an object of this invention to provide longitudinal joint supports formed of two parts, one of which is embedded in one of the lanes and which has a socket for later receiving a key of the other part, and in which said socket is protected against entry of pavement material into the same.

Another object is to provide a longitudinal joint support formed in two parts, one of which has a socket and the other of which has a terminal portion formed to extend into the socket and interlock therewith to hold the two parts of the joint support in correct alinement wih each other and to provide for movement of one part relatively to the other in a direction lengthwise of the pavement strip.

A further object is to provide a longitudinal joint support of this type which also serves as a dowel for permitting movement of two pavement strips toward and away from each other but preventing vertical movement of said strips.

In the accompanying drawings:

FIG. 1 is a transverse, vertical, sectional elevation of a pavement strip having one part of the joint support embodying this invention embedded therein.

FIG. 1a is a similar view showing the part of the joint cooperating with a pavement lane having a groove for forming with an adjoining lane a longitudinal tongue and groove joint.

FIG. 2 is a similar section showing the other part of the joint support applied to the part embedded in the pavement.

FIG. 3 is a transverse, vertical, sectional view showing two adjacent pavement strips with my improved longitudinal joint support arrangd therein.

FIG. 4 is a longitudinal view, on an enlarged scale, partly in section, showing the second part of the joint support having its end portion locked in the cavity of the first part.

FIG. 5 is a sectional view thereof on line 5—5, FIG. 4.

FIGS. 6–10 are transverse sectional elevations on lines 6—6, 7—7, 8—8, 9—9 and 10—10, FIG. 4.

FIG. 11 is a sectional view of a pavement form having the first part of a joint support of modified construction applied thereto.

FIG. 12 is a vertical, sectional view of the pavement about the first part of the joint support and showing the second part of the joint support applied to the first part.

FIG. 13 is a fragmentary, sectional elevation on line 13—13, FIG. 12.

FIG. 14 is a view similar to FIG. 6 of a modified construction.

15 and 16 represent parts of two lanes of a highway and it is assumed that the lane 15 is laid before the lane 16. The two lanes are connected at intervals with joint supports embodying my invention which hold the two lanes against vertical separation from each other. The joint supports each include a part 17 embedded in the first concrete lane 15 and having an anchoring member 18 provided with laterally extending projections 19 which serve to hold the anchoring member against movement in the direction of its length. The anchoring member part 17 has a socket 20 formed in the outer end thereof. Generally the two adjacent lanes are connected with each other by integrally formed tongue and groove connections which serve to resist vertical movement of one lane relatively to the other, but the joint support herein shown also resists such vertical movement of the two lanes relatively to each other.

22 in FIGS. 1 and 11 represents a form of the type commonly used and arranged at a side of a pavement lane and which may be of any suitable or well known shape. This pavement form is provided at intervals with holes 24 and the recessed part or cavity of the first part of the joint support member is provided with an internally threaded socket 25. A bolt or stud 27 extends through the hole 24 in the pavement form and into the socket of the first joint support, and when this stud 27 is tightened, the socket of the first joint support will be drawn tightly against the form 22, which serves the dual purpose of supporting the first joint support in correct relation to the lane or strip of concrete to be poured and also prevents any concrete or road material from entering into the socket or cavity of the first part of the longitudinal joint support. Consequently when the second pavement strip or lane 16 is to be poured, the form 22 is released by unscrewing the studs 27, thus leaving the socket in the first part of the joint support open to receive the second part 30 which may then be applied to the first joint support part in such a manner as to extend outwardly from the edge of the first pavement strip into the space to be filled by the paving material for the second strip. This scond joint support part has a shank 31 which extends into the second pavemnt strip 16 and is also provided with the projection 32 similar to the projection formed on the first joint support part.

My improved joint supports may equally well be used with pavements in which adjacent pavement strips have longitudinal tongue and groove connections with each other. As shown in FIG. 1a, the form 22 has secured on the part facing the first pavement strip a channel-shaped part 28 which may be of sheet metal and welded or otherwise secured to the form 22 and which has bolt holes in alinement with the holes in the form 22. Consequently a stud or bolt 29 may pass through both holes and into the threaded hole 25 in the socket of the first part of the joint support. The channel-shaped part 28 has its flat face 33 positioned so that the open end of the socket in the joint support part 17 will be drawn by the bolt 29 against this flat face so as to exclude concrete or other road material entering the socket. When the forms 22 with the trough-shaped extension 28 are removed from the first pavement lane, a longitudinally extending groove is formed into which the concrete for the next lane flows to form a connection between the two pavement strips which will prevent vertical movement of one strip relatively to the other. When the form 22 is removed the other part of the joint support may of course be applied to the socket of the part 17, as described in connection with FIGS. 1–3.

The interlocking parts between the two joint support parts are such as to permit them to be securely fastened to each other so that the second joint support part when secured to the first joint support part will be correctly positioned in the second pavement lane, and will also permit a limited amount of movement of the two joint support parts relatively to each other lengthwise of the pavement lanes.

In the construction shown for this purpose, the socket of the first joint support part has flanges or ledges extending into the socket, those shown being at the outer edge of the socket where they will partly close the socket. Two of these segmentarily extending webs or flanges 35 are provided at diametrically opposite parts of the socket overhanging the socket, thus providing an elongated transverse opening 36 into which a key 37 may extend. This key and the socket are such that after the key is inserted into the socket they will become interlocked after turning the key approximately through a right angle, to securely hold the two parts of the joint support when in correct relation to each other. In order to provide a tight interlocking of the two parts, the bottom of the socket member is provided with a pair of inclined or cam surfaces 40 having a slight inclination, for example, approximately six degrees, which upon further turning, terminates in flat surfaces 41. The key 37 is also provided on its outer end with similarly inclined surfaces 43 which terminate in flat portions 44. The flat portions 44 are so located with reference to the open end of the socket 20 that when the key is turned in the socket so that the inclined portions 43 of the key cooperate with the inclined portions 40 in the socket, the flat portions 41 and 44 of the socket and key will rest against each other. The riding of the key upon the inclined portions of the socket draws the inner edges of the key against the segmental flanges or webs 35 and thus locks the second joint support part to the first joint support part so that the anchoring members 18 and 31 will be practically in alinement. Furthermore, there is a stop lug 46 provided in the socket which limits the turning of the second part of the joint support when the key 37 abuts against this stop lug and after the two flat portions 41 and 44 are in engagement. The stop lug is so located that the key will not contact it unless turned to a slight extent beyond its intended position in which case it is turned back so that the projection 32 is parallel to the projection 19. When the two parts of the joint support are arranged in this manner, they may move on their flat faces so that the key moves in one direction towards the stop lug and in the other direction away from the stop lug.

Means are preferably provided to prevent the two parts of the joint support from moving vertically relatively to each other because of the slight clearance necessary between the ends of the key and the inner wall of the socket. Such vertical motion can be eliminated by either providing inwardly extending flat portions with surfaces 45, FIGS. 6 and 9, on the parts of the inner wall of the socket which are adjacent to the ends of the key when in its locking position, or by making the neck portion which extends into the transverse opening 36 of elongated shape with portions 48 which engage the edges of the webs or flanges 35 when the key is in locking position, FIG. 14.

In order to make it possible for the key to move relatively to the socket after the key has been locked in the socket, the key is made with the outer ends thereof spaced from the inner, annular wall of the socket, and if desired, the key may also have the ends thereof tapered outwardly to a slight extent, as shown in the drawings, so that when the flat portions of the cam surface 45 of the socket and the key are in engagement, they not only lock the two parts of the joint support in correct relation to each other, but also permit a limited movement of the key relatively to the socket in a direction lengthwise of the two adjoining strips or lanes of the pavement see FIG. 9. Thus a limited movement of the two adjacent pavement strips may take place without damage to the joint support or pavement.

In order to ensure that the relative movements of the two parts of the joint supports will not be obstructed by any foreign matter such for example as paving material, entering into the socket, the second part of the joint support tis provided in spaced relation to the key with a cover flange 60 which is formed to close the opening in the outer end of the socket when the second part of the joint support is in correct relation to the first part.

It is also desirable under some conditions to employ my improved longitudinal joint supports for opposing vertical movement of one pavement strip relatively to the other, as well as providing longitudinal or horizontal movement of one strip relatively to the other, but without limiting the movement of adjacent strips toward or from each other. Such arrangement may be desirable in some highways and is generally necessary in the runways of airports. This type of joint support can readily be produced by omitting the projections 19 and 32 shown in FIGS. 1 to 6. This construction is also illustrated in FIGS. 11–13, in which each of the joint supports has shanks or anchoring members 50 and 52 which, however, are without lateral projections at the ends thereof and which are formed so that they can move in the directions of their lengths in the pavement strips 51. These shanks may be of I-shape in cross section, as shown in FIG. 13, so as to offer a high resistance to vertical displacement when correctly embedded in a pavement strip or lane. The interlocking portions of this joint support, such as the hollow socket 53 and the key cooperating therewith, are similar to those described in connection with the joint support shown in FIGS. 1–10, including the cover flange 54, which is similar to the flange 60 shown in the preceding figures.

In the use of the device as described, it is of course important that the two parts of the joint support may be arranged in correct relation to the pavement so that the cooperating flat faces in the socket and on the key are positioned parallel to the pavement to permit the two parts of the joint support to move relatively to each other in a substantially horizontal direction. In the construction shown, the outer anchoring projections 19 of the first part of the joint support are so arranged relatively to the flat faces in the socket and on the key that when the projections are in certain angular positions, for example, vertical, the flat faces will be parallel to the pavement. Consequently the projection 32, when the second part of the joint support is in correct position, will also extend in a substantially vertical direction.

Then, when the second joint support member 30 is attached to the first part of the joint support, the entrance of the key into the socket is of course controlled by the opening 36 in the socket member, and the clearance between the flat parts of the socket member and the key is very small so that ordinarily a wrench is required to turn the second part of the socket member into its operative position.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A joint support for holding two adjacent strips against movement vertically relatively to each other along their abutting longitudinal edges but permitting movement of one strip lengthwise relatively to the other, said joint support including two anchoring parts to be embedded in two adjacent sections of the two pavement strips, one of said parts having a socket portion with an outwardly facing opening accessible at an edge of one of said pavement strips when said part is embedded therein, the other part having a key adapted to fit into said socket to interlock therewith, flanges on said socket which prevent removal of said key from said socket in the direction of the length of the joint support when said key is turned after entry into said socket, cooperating wedge means in said socket and on said key which force said key into engagement with said flanges to prevent movement of said key in the direction of length of said anchoring parts, and horizontally extending flat faces in said socket iwth which said key cooperates after being turned into frictional engagement with said flanges, said flat faces extending in a direction of the length of said pavement strips and transversely of the length of said anchoring parts and being of sufficient length to permit sliding movement of said key and flat faces relative to each other to permit corresponding movement of said pavement strips relatively to each other in the direction of the length of said pavement strips.

2. A joint support according to claim 1 in which said flanges on said socket portion constitute a partial closure of said outwardly facing opening, and another flange on said other part of said joint support spaced from said key and located on the exterior of said socket when said key is in engagement with said first mentioned flanges, said other flange covering the remainder of said opening when said two parts are interlocked to prevent paving material from entering said socket.

3. A joint support according to claim 1 and including a stop projection in said socket which limits the extent to which said key can be turned when engaging said flat faces.

References Cited by the Examiner
UNITED STATES PATENTS

| | | | |
|---|---|---|---|
| 2,127,973 | 8/1938 | Isett | 94—8 |
| 2,187,912 | 1/1940 | Peirce | 94—8 |
| 2,319,713 | 5/1943 | Williams | 94—18 |
| 2,352,673 | 7/1944 | Westcott | 94—17 |
| 2,588,609 | 3/1952 | Blackhall | 94—8 |

JACOB L. NACKENOFF, *Primary Examiner.*

CHARLES E. O'CONNELL, *Examiner.*

N. C. BYERS, *Assistant Examiner.*